United States Patent
Uehara et al.

(10) Patent No.: US 6,734,895 B1
(45) Date of Patent: May 11, 2004

(54) DIGITAL CAMERA AND RECORDING MEDIUM

(75) Inventors: Ryo Uehara, Yokohama (JP); Akira Ohmura, Kawasaki (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 09/208,429

(22) Filed: Dec. 10, 1998

(30) Foreign Application Priority Data

Dec. 12, 1997 (JP) ............................................. 9-342397

(51) Int. Cl.⁷ .............................. H04N 7/18; H04N 9/47; H04N 9/73; G03B 17/00; G03B 7/00
(52) U.S. Cl. ...................... 348/79; 348/80; 348/223.1; 396/225; 396/530; 396/531; 396/532
(58) Field of Search .......................... 348/79, 80, 258, 348/223.1; 396/232, 531, 532, 225, 530

(56) References Cited

U.S. PATENT DOCUMENTS

| 3,987,463 A | * | 10/1976 | Nishikawa et al. | ......... 359/374 |
| 4,021,825 A | * | 5/1977 | McCann et al. | ............. 396/263 |
| 4,279,487 A | * | 7/1981 | Baker et al. | ................. 396/432 |
| 4,837,595 A | * | 6/1989 | Leiter et al. | ................. 396/225 |
| 4,924,249 A | * | 5/1990 | Aihara et al. | ................ 396/303 |
| 5,022,744 A | * | 6/1991 | Leiter | .......................... 359/385 |
| 5,060,005 A | * | 10/1991 | Itoh et al. | .................... 396/303 |
| 5,239,171 A | * | 8/1993 | Takabayashi et al. | ........ 250/205 |
| 5,359,379 A | * | 10/1994 | Kohno et al. | ................ 396/529 |
| 5,608,451 A | * | 3/1997 | Konno et al. | .................. 348/69 |
| 5,631,699 A | * | 5/1997 | Saito | ........................... 348/143 |
| 5,640,223 A | * | 6/1997 | Taniguchi et al. | .......... 396/301 |
| 5,732,294 A | * | 3/1998 | Kawamura et al. | .......... 396/263 |
| 5,822,632 A | * | 10/1998 | Miyazawa et al. | .......... 396/529 |
| 5,877,811 A | * | 3/1999 | Iijima et al. | ............. 348/220.1 |
| 6,005,964 A | * | 12/1999 | Reid et al. | ..................... 378/42 |
| 6,104,430 A | * | 8/2000 | Fukuoka | .................. 348/231.6 |
| 6,151,161 A | * | 11/2000 | Mayer et al. | ................ 359/392 |
| 6,445,410 B2 | * | 9/2002 | Kawano | .................. 348/211.1 |
| 6,456,319 B1 | * | 9/2002 | Hirasawa et al. | .............. 348/97 |

FOREIGN PATENT DOCUMENTS

JP    06292208 A    * 10/1994    ............ H04N/9/04

* cited by examiner

*Primary Examiner*—Andrew Christensen
*Assistant Examiner*—Brian Genco
(74) *Attorney, Agent, or Firm*—Oliff & Berridge PLC

(57) ABSTRACT

A digital camera has a mounting part to mount a shooting lens or other optical equipment, and includes a mode switch that changes between a mode that shoots using the shooting lens and a mode that shoots using the other equipment. The camera includes an information interface that communicates with the shooting lens or with the other equipment, and receives information from the shooting lens or from the other equipment corresponding to the set mode. A camera controller controls the camera to change a type of information received through the interface from the shooting lens or from the other equipment based upon the set mode. When changed to the mode that shoots using the other equipment, the interface receives information corresponding to a color temperature or a brightness of a light source of the other equipment, and the controller controls the camera shooting state based upon that received information.

14 Claims, 9 Drawing Sheets

DIGITAL CAMERA AND RECORDING MEDIUM

INCORPORATION BY REFERENCE

The disclosure of the following priority application is herein incorporated by reference:

Japanese Patent Application No. 9-342397 filed Dec. 12, 1997.

BACKGROUND OF THE INVENTION

1. Field of the Invention

This invention relates to a digital camera and to a recording medium, and more particularly to a digital camera and recording medium that are mounted on and used with a microscope.

2. Description of the Related Art

A digital camera shoots an object image using an imaging element such as a CCD (charge coupled device) or the like. After converting the image data resulting from this shooting operation into digital format, it is recorded to a recording medium such as a memory card. An image corresponding to the recorded data is displayed on a monitor connected externally to the digital camera, or is displayed on a monitor such as a liquid crystal display or the like housed in the digital camera.

Furthermore, there are also shooting lenses that are attachable to, or on which a microscope can be mounted.

SUMMARY OF THE INVENTION

When a shooting mode changeover switch 24 is operated by a user and a mode of a digital camera is changed over to a microscope shooting mode, a controlling circuit 14 recognizes that a microscope is mounted on a lens mounting part of the camera main body instead of a lens 1, controls various settings of the digital camera, and can perform an appropriate microscope shooting.

DESCRIPTION OF THE PREFERRED EMBODIMENT(S)

Figure 1:
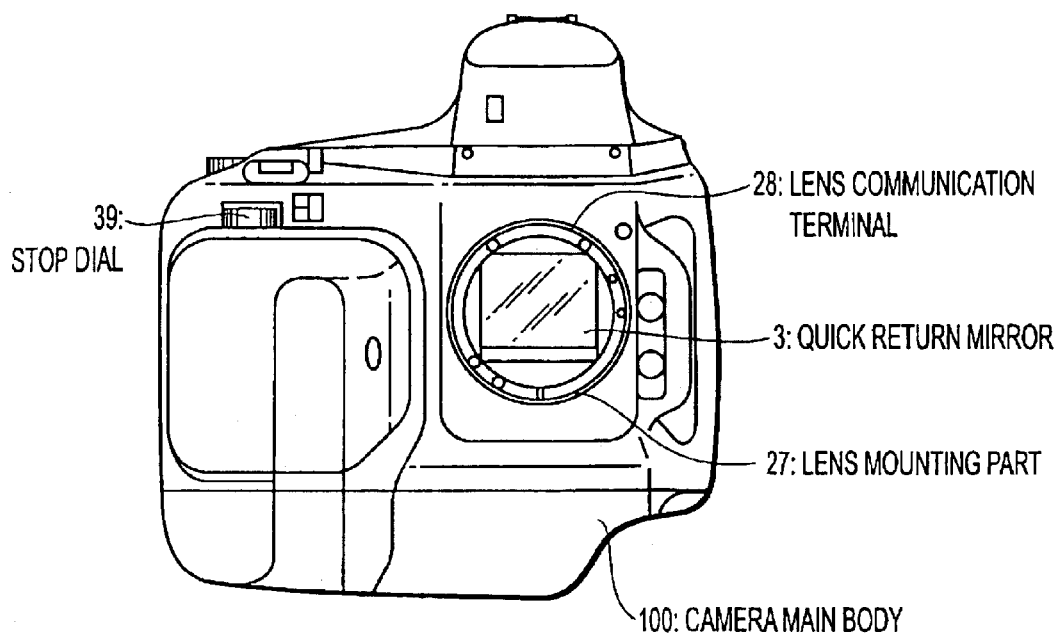
FIG. 1 is a front view of a digital camera to which a shooting device of this invention is applied.

FIG. 1 shows a front view of one embodiment of a digital camera of this invention (hereafter referred to as a camera). Here, an example is shown when an undepicted microscope is not mounted to the camera. The later-mentioned controlling circuit 14 performs communication of signals with the lens 1 or the microscope through a lens communication terminal 28 disposed in a lens mounting part (mounting face) 27 that fixes the lens 1 or the microscope onto the camera main body 100, and thereby detects whether a lens 1 or a microscope is mounted on the camera main body 100. The later-mentioned quick return mirror 3 is disposed in the interior of the lens mounting part 27. A stop dial 39 is used when a stop value is set.

Figure 2:
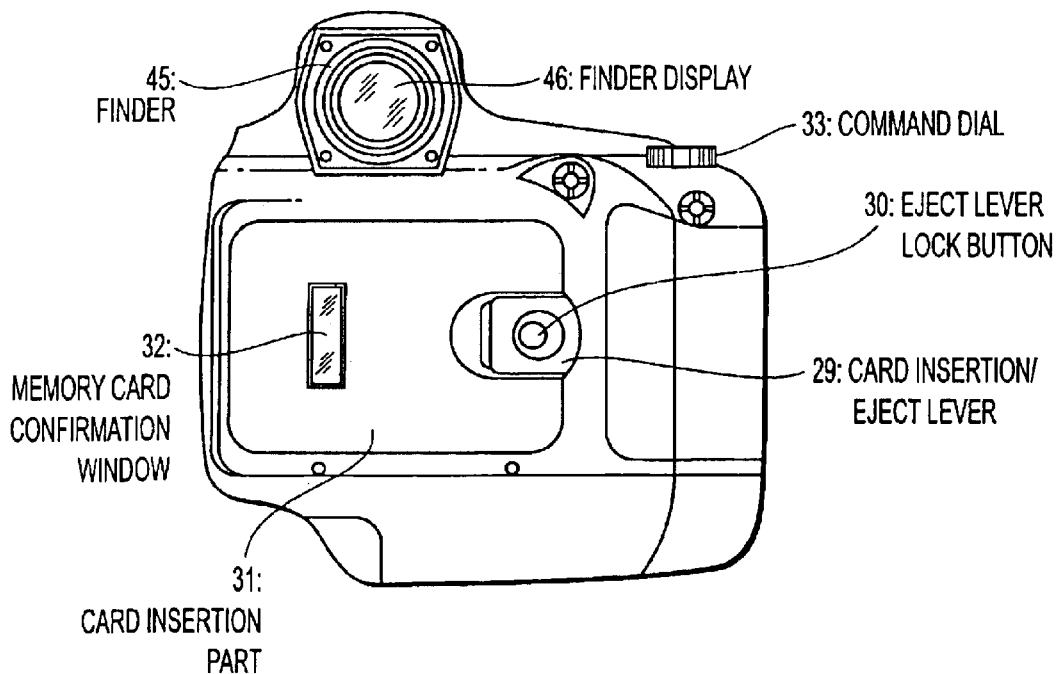
FIG. 2 is a rear view of a digital camera to which a shooting device of this invention is applied.

FIG. 2 is a rear view of the camera shown in FIG. 1. A card insertion/eject lever 29 can open and close a rear cover (card insertion part) 31 as an eject lever lock button 30 is pressed and slid. In the rear cover 31, a memory card confirmation window 32 is disposed through which it can be visually confirmed whether the memory card 13 is inserted into the main body.

A command dial 33 can be endlessly rotated, clicking as it rotates. When this is independently used, a shutter speed value can be set, and when it is used with each setting button, setting of specified information can be performed. A finder display part 46 is structured by an LCD, LED (light emitting diode), or the like, and is disposed within the finder 45, and displays various information.

Figure 3:
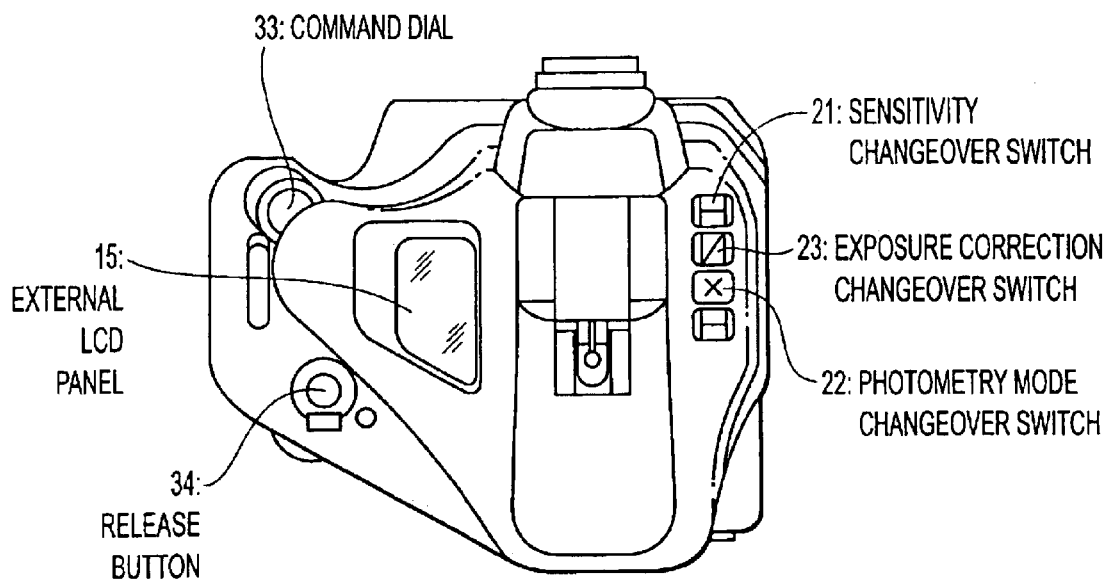
FIG. 3 is a plan view of a digital camera to which a shooting device of this invention is applied.

FIG. 3 is a front view of the camera shown in FIG. 1. A sensitivity changeover switch 21 can perform sensitivity changeover when used with the command dial 33. An exposure correction changeover switch 23 can set an exposure correction value when used with the command dial 33. A photometry mode changeover switch 22 can change a photometry mode when used with the command dial 33. For example, in multiple pattern photometry, an object to be photometered can be selected and determined.

Figure 4:
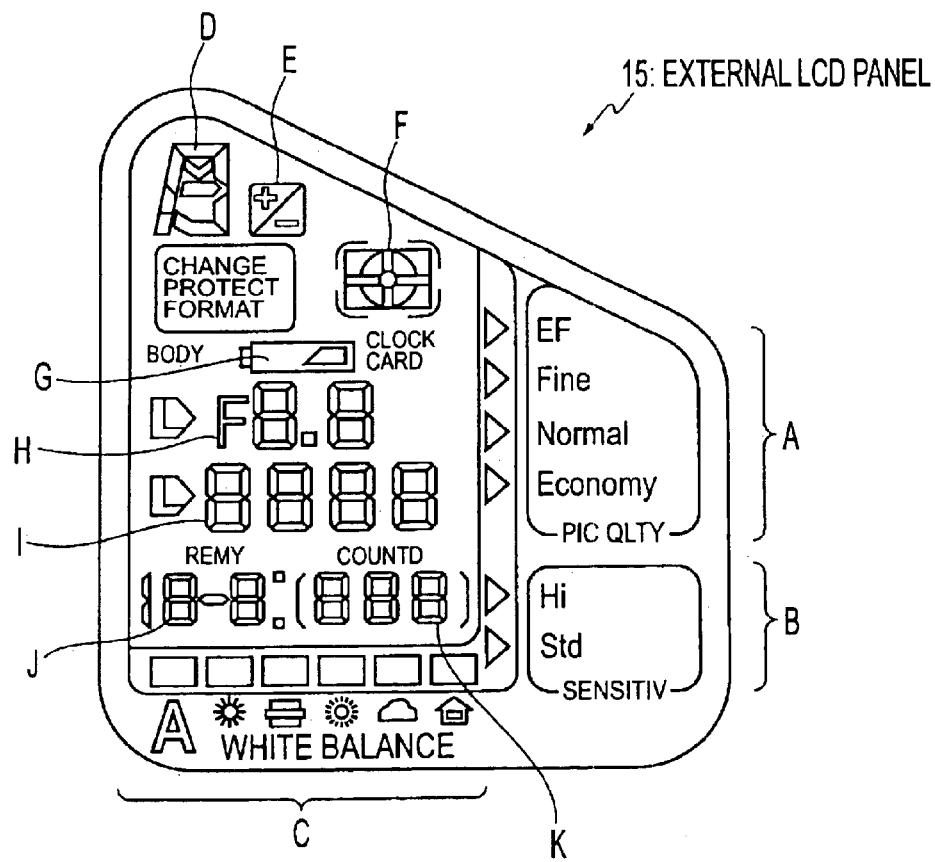
FIG. 4 is a view showing a display example of an external LCD panel (display device) 15.

A release button 34 turns on an operation circuit, which will be discussed hereafter with reference to FIG. 7, when it is half-pressed, and focus control is performed. Furthermore, when release button 34 is full-pressed, release is performed. A display device (external LCD (liquid crystal display) panel) 15 displays various information as shown in FIG. 4. A compression mode is displayed in a display area A. Sensitivity during the shooting, that is, the sensitivity of the CCD 9, which will be discussed later, is displayed in a display area B. A white balance setting mode is displayed in a display area C. An exposure mode is displayed in a display area D. The existence of exposure correction is displayed in a display area E. A photometry mode is displayed in a display area F. A battery remaining amount is displayed in a display area G. A stop value is displayed in a display area H. Shutter speed is displayed in a display area I. The number of remaining frames that can be recorded to the memory card 13 is displayed in a display area J. A frame number for the following shooting operation is displayed in a display area K.

Figure 5:
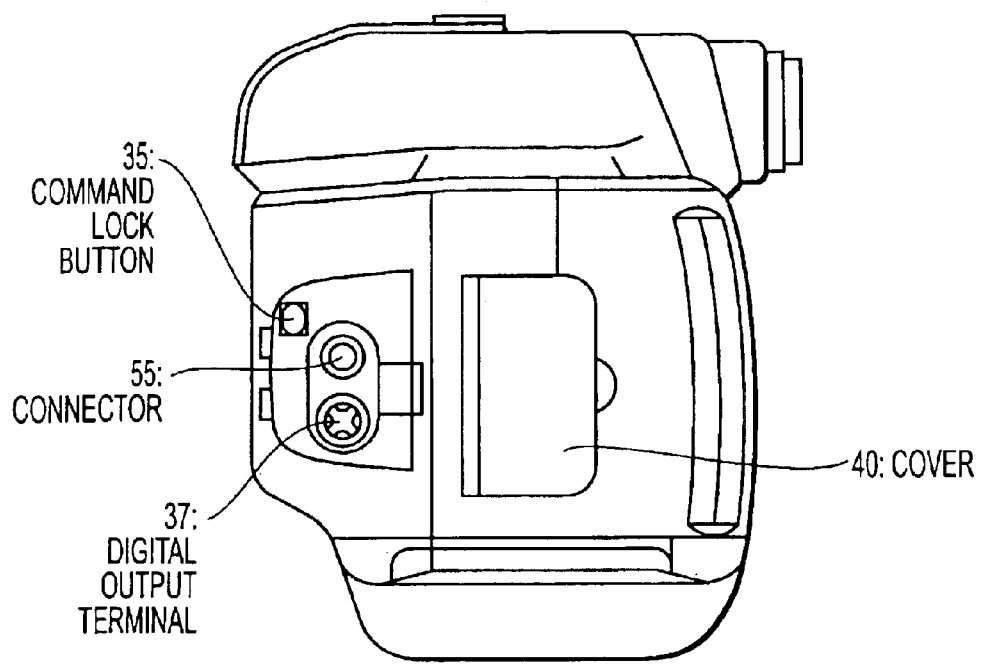
FIG. 5 is a right side view of a digital camera to which a shooting device of this invention is applied.

FIG. 5 is a right side view of the camera of FIG. 1. When the command dial 33 is rotated in either the right or left direction, while pressing the command lock button 35, the shutter speed setting value displayed on the display device 15 is locked. Furthermore, when the stop dial 39 is rotated to either the right or left direction while pressing the command lock button 35, the stop value setting displayed on the display device 15 is locked.

Figure 6:
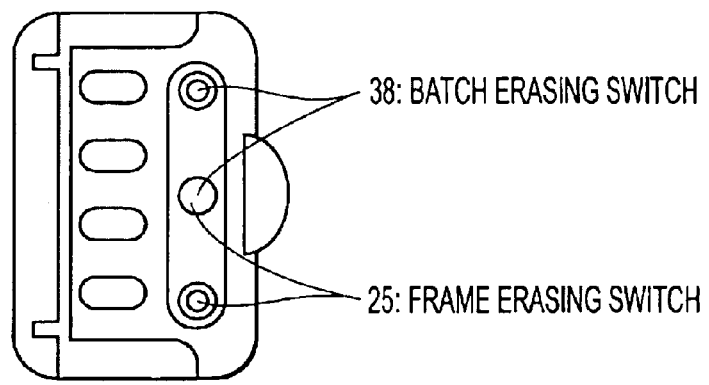
FIG. 6 is a view showing a batch erasing switch and a frame erasing switch.

In FIG. 5, within the cover 40, three buttons are disposed as shown in FIG. 6. The top and middle buttons comprise a batch erasing switch 38. By pressing these buttons simultaneously, it is possible to erase all the data recorded in the memory card 13. Additionally, the middle and bottom buttons comprise a frame erasing switch 25. By pressing these buttons simultaneously, it is possible to erase the data (frame) recorded previously among the data recorded in the memory card 13.

Figure 7:
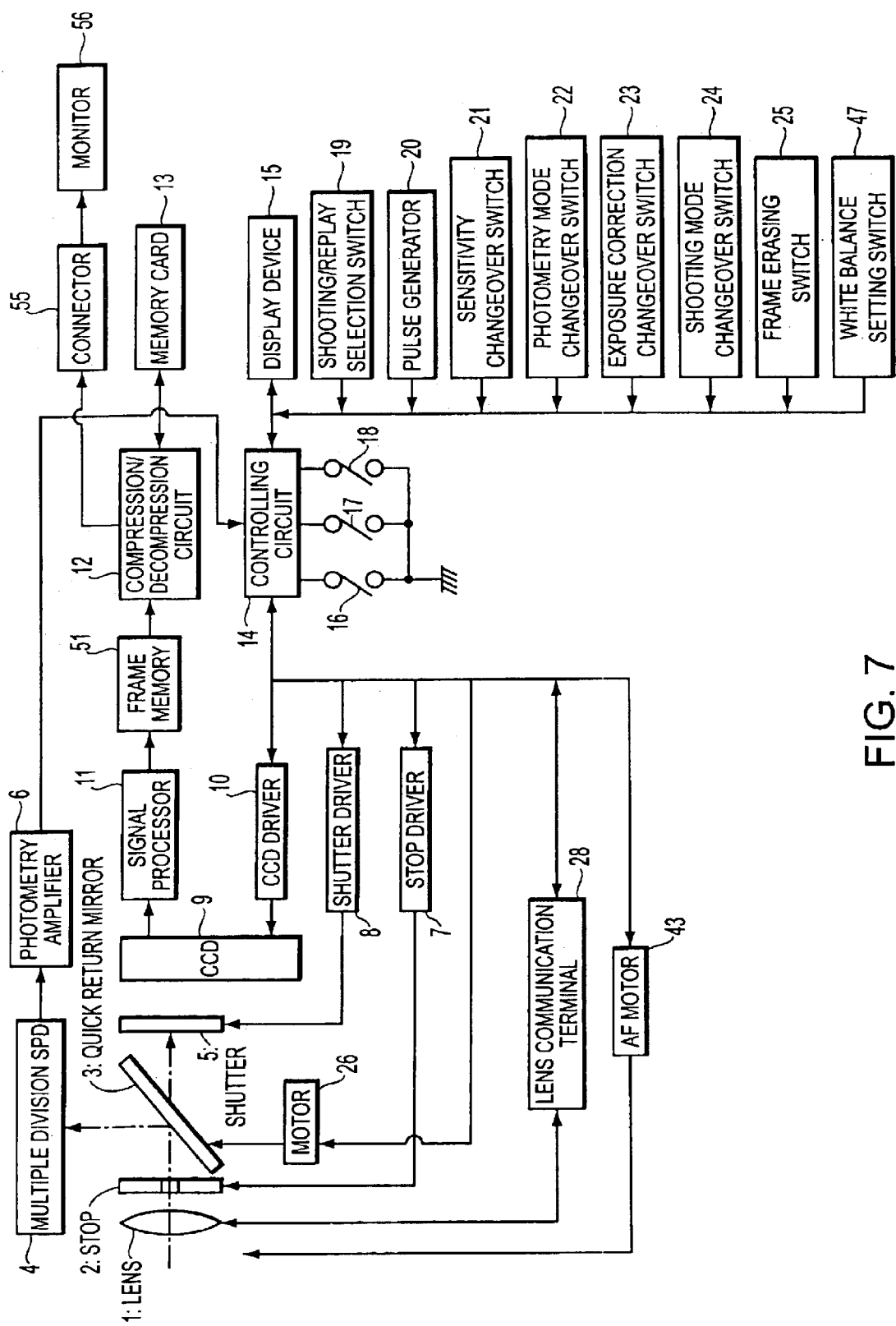
FIG. 7 is a block diagram showing a detailed structural example of a digital camera to which a shooting device of this invention is applied.

FIG. 7 is a block diagram showing a detailed structural example of the digital camera shown in FIGS. 1–6. A lens 1 collects light rays from an object. A stop 2 adjusts the light amount of the light rays from the lens 1. A quick return mirror 3 reflects part of the light rays from the object incident through the stop 2 and the lens 1 and directs them to a multiple division SPD (silicon photo diode) 4, and transmits the other parts of the light therethrough. The multiple division SPD 4 is structured by a plurality of photometry elements, divides the field into a plurality of areas, and performs photometry. A photometry amp 6 amplifies the output of each photometry element.

A stop driver 7 changes the stop amount of the stop 2. A shutter driving circuit 8 controls the opening and closing of the shutter 5. A CCD (charge coupled device) 9 receives the light rays from the object in accordance with the opening and closing of the shutter 5. A signal charge corresponding to the received light amount is accumulated, and the accumulated signal charge is output as image data. A CCD driving circuit 10 controls the charge accumulation and the charge transmission of the CCD 9. The signal processing circuit 11 performs correction processing such as white balance adjustment, γ correction, and edge correction, with respect to the image data that has been output from the CCD 9.

A frame memory 51 temporarily stores the image data that has been correction processed in the signal processing circuit 11. A compression/decompression circuit 12 compresses image data from the frame memory 51 by, for example, the JPEG (Joint Photographic Experts Group) method, and the image data is provided to the memory card 13. Furthermore, image data that has been read from the memory card 13 is decompressed and is output to an external monitor 56 connected to a connector 55. The memory card 13 stores the image data provided from the compression/decompression circuit 12, and supplies stored image data to the compression/decompression circuit 12.

The controlling circuit 14 controls the stop driver 7, the shutter driver 8, the CCD driver 10, and the like and performs calculation processing such as exposure calculation. Additionally, it controls the motor 26 and rotates the quick return mirror 3 during shooting, and the quick return mirror 3 is withdrawn out of the path of the light rays incident through the lens 1 and the stop 2. Furthermore, an auto focus (AF) motor 43 is controlled and focus control is performed. In addition, through the lens communication terminal 28, it is detected whether the lens 1 or a microscope is mounted on the camera main body 100.

As described earlier, with reference to FIG. 4, the display device 15 is structured by, for example, an LCD, and displays various information needed for shooting and replaying. The display device 15 is disposed, for example, on the top of the camera main body 100.

A switch 16 changes whether power is provided to each part of the camera. A switch 17 is turned on when the release button 34 is half-pressed. A switch 18 is turned on when the release button 34 is full-pressed.

A shooting/replaying selection switch 19 is operated when changing whether shooting or replaying is to be performed. A pulse generator 20 outputs pulse signals whenever the command dial 33 is rotated by a specified amount. A sensitivity changeover switch 21 is operated when the sensitivity of the CCD 9 is changed. A photometry mode changeover switch 22 is operated when the photometry mode is changed. An exposure correction changeover switch 23 is operated when the exposure correction is changed.

A shooting mode changeover switch 24 is operated when changing between a normal shooting mode that performs shooting by using a program mode, a stop priority mode, a shutter priority mode, a normal shooting lens and a microscope shooting mode that performs shooting using a microscope. A frame erasing switch 25 is operated when image data is erased from the memory card 13. A white balance setting switch 47 is operated when the white balance setting mode is set.

A shooting system is structured by the above-mentioned CCD 9, signal processing circuit 11, CCD driver 10, and compression/decompression circuit 12. Furthermore, a photometry system is structured by the multiple division SPD 4 and the photometry amp 6.

Among the recent shooting lenses, there are many lenses that house a CPU. It is possible to transmit the lens information (focal distance information, aperture f value information, largest stop step, lens shading information, ejection pupil position information, or the like) to the camera main body 100 by communication between the controlling circuit 14 of the camera main body 100 and the CPU of the shooting lens through the lens communication terminal 28. Furthermore, based upon the information relating to the shooting lens obtained by the communication with the shooting lens, the controlling circuit 14 of the camera main body 100 performs the photometry calculation. Additionally, through the lens communication terminal 28 disposed in the mounting face (lens mounting part) 27 of the camera main body 100, the controlling circuit 14 of the camera main body 100 communicates not only with the lens 1 but also with the microscope main body, and it is possible to obtain necessary information relating to the lens and the light source from the CPU of the microscope side.

Serial communication is mainly used for the communicating method. The lens communication terminal 28 normally has five electrical connecting points for communication. That is, there are a power source line to provide power to the CPU within the lens 1, a ground line, a clock line for communication, a data line to transmit data, and a data control line to transmit controlling signals to control the transmission of data. When the lens 1 is mounted onto the camera main body 100, power is provided to the lens 1 through the power source line from the camera main body 100. When the CPU disposed in the lens 1 is activated, it performs serial communication with the camera main body 100 by using the communication lines structured by the data line, data control line, and/or the like.

Normally, in the communication between the CPU of the lens 1 and the controlling circuit 14 of the camera main body 100, there are many cases in which the camera main body 100 receives information from the lens 1 and that there is hardly any information to be transmitted to the lens 1 from the camera main body 100. Therefore, in this type of communication, the transmission data to be transmitted from the camera main body 100 to the lens 1 is 0 bytes and the data to be transmitted from the lens 1 to the camera main body 100 is several bytes.

Meanwhile, when the camera 100 is mounted onto the microscope, the camera main body 100 must receive data from the microscope, so the communication content has to be changed by something that is connected to the lens communication terminal 28. For this type of case, the camera main body 100 needs to determine whether a normal shooting lens is mounted and it should operate in the normal shooting mode, or a microscope is mounted and it should operate in the microscope shooting mode. Because of this, for example, a method can be considered such that a switch is provided that is turned on only when the microscope is mounted onto the lens mounting part 27 of the camera main body 100, and the microscope shooting mode is thus detected.

Incidentally, when a digital camera of a single lens reflex type is mounted onto the microscope and shooting is performed, a microscope shooting mode is loaded such that the shooting is performed by controlling the electronic shutter after vibration of camera due to the mirror up operation and the front curtain travel operation is stopped. Therefore, the photograph cannot be blurry because of the effects of the mirror up operation and the front curtain travel operation. The setting of the microscope shooting mode can be performed by, for example, operating the shooting mode changeover switch 24. Therefore, the determination as to whether the microscope shooting mode is entered can be easily detected without providing a special switch. Therefore, by taking advantage of the existence of this mode, when it is set at the microscope shooting mode, communication with the microscope main body is performed and when it is set at the normal shooting mode, communication with the lens 1 is performed.

Figure 8:
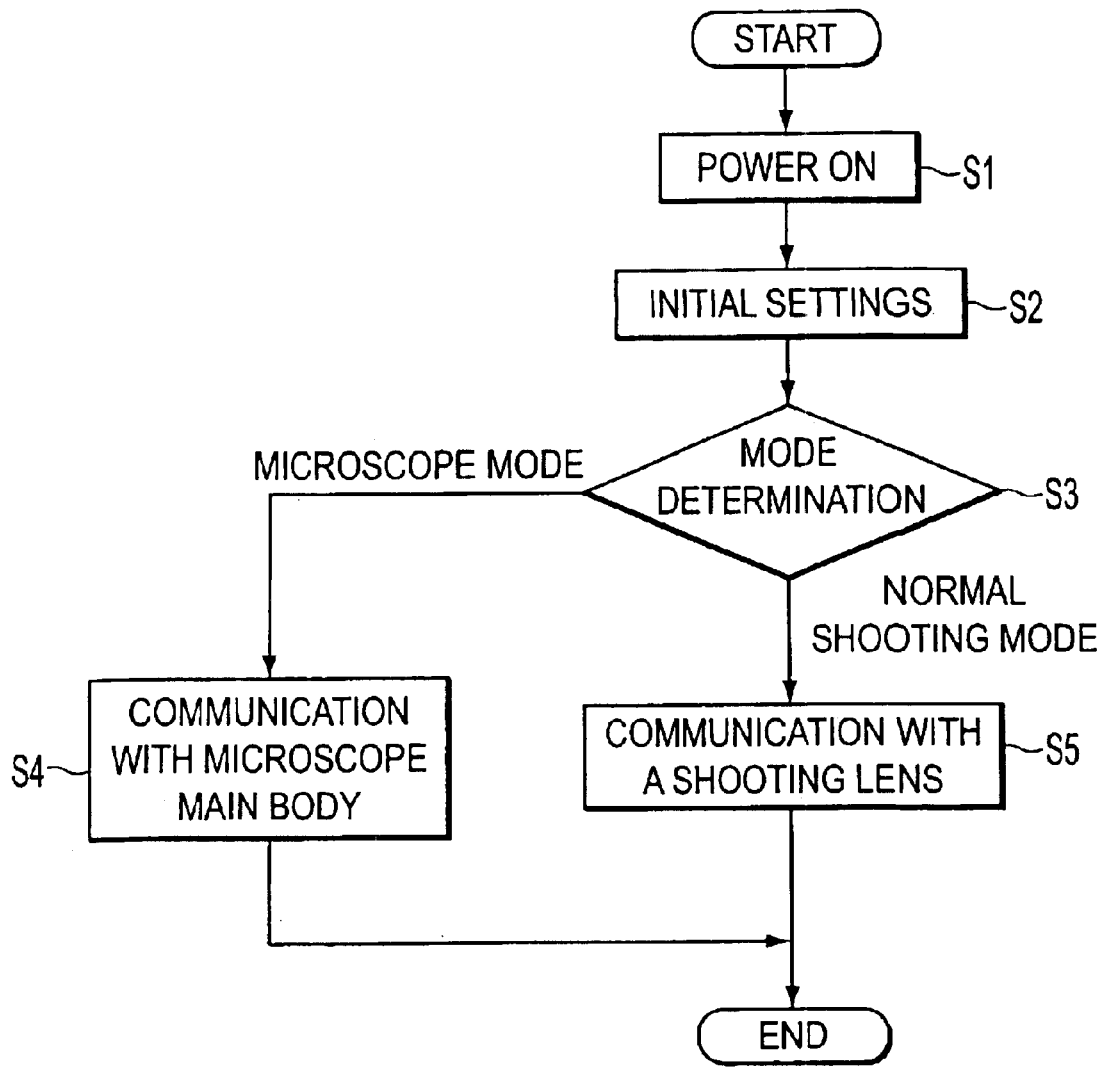
FIG. 8 is a flow chart explaining a procedure used to perform communication corresponding to a shooting mode of a camera main body 100.

That is, as shown in the flow chart of FIG. 8, initially, when the power of the camera main body 100 is turned on in step S1, various initial settings are performed in step S2. Next, in step S3, it is determined whether the shooting mode of the camera main body 100 is set at the microscope shooting mode or the normal shooting mode. When it is determined that the microscope shooting mode is set, the program proceeds to step S4, the controlling circuit 14 performs communication with the microscope main body through the lens communication terminal 28, and the camera main body 100 receives information relating to the light source and the lens of the microscope from the microscope.

Meanwhile, when it is determined that the normal shooting mode is set in step S3, the program proceeds to step S5, the controlling circuit 14 performs communication with the lens 1 through the lens communication terminal 28 and receives the information relating to the lens 1. When the processing is completed in step S4 or step S5, this routine is completed.

When the white balance is set, normally based upon the setting information from a specified white balance setting device, the white balance control value is set. For example, when the white balance setting switch 47 is operated and the white balance is set at "automatic adjustment mode", the color temperature is measured by a specified white balance daylighting window and white balance control appropriate for the color temperature is performed. Furthermore, when the white balance is set at the "light bulb mode", the color temperature is set at the temperature of the halogen lamp (absolute temperature 3000K), and the white balance control is performed.

With respect to the light source of the microscope, various light sources can be used for the microscope, so the color temperature varies depending upon the light source. Therefore, the color temperature information of the light source is transmitted to the camera main body 100 by the communication from the microscope main body, the camera main body 100 performs the white-balance control based upon the information, and the optimum shooting can be performed.

Figure 9:
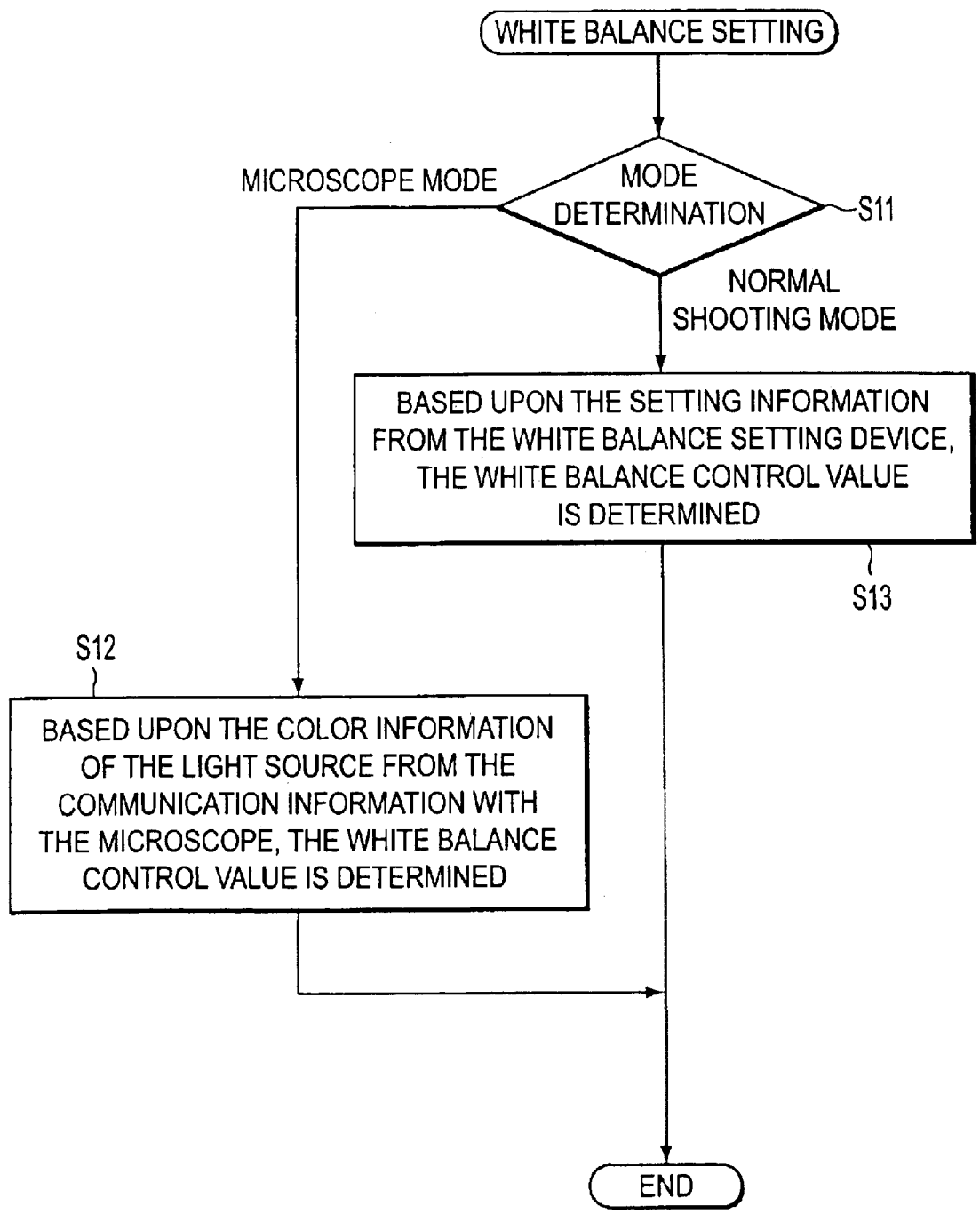
FIG. 9 is a flow chart explaining a procedure used to determine a white balance control value corresponding to a shooting lens or to a microscope mounted on a camera main body 100.

That is, as shown in FIG. 9, initially, the shooting mode of the camera main body 100 is determined to be set at either the microscope shooting mode or the normal shooting mode in step S11. If it is determined that it is set at the microscope shooting mode, the program proceeds to step S12. The camera main body 100 receives information relating to the color temperature of the light source from the microscope through the lens communication terminal 28, and the controlling circuit 14 sets the white balance control value based upon this information. Meanwhile, when it is determined that it is set at the normal shooting mode in step S11, the white balance control value is set in step S13, based upon the setting information from the white balance setting device.

There are some microscopes in which the light source can be changed to an arbitrary brightness. For example, when a light source adjustment knob or the like is rotated, the brightness of the light source is determined by the position of the knob. In this case, the position information indicating the rotation position of the light source adjustment knob is transmitted to the camera main body 100 through the lens communication terminal 28, the controlling circuit 14 of the camera main body 100 can calculate the color temperature of the light source based upon the position information, and change the setting of the white balance. By so doing, it is possible to perform the optimum shooting.

Figure 10:
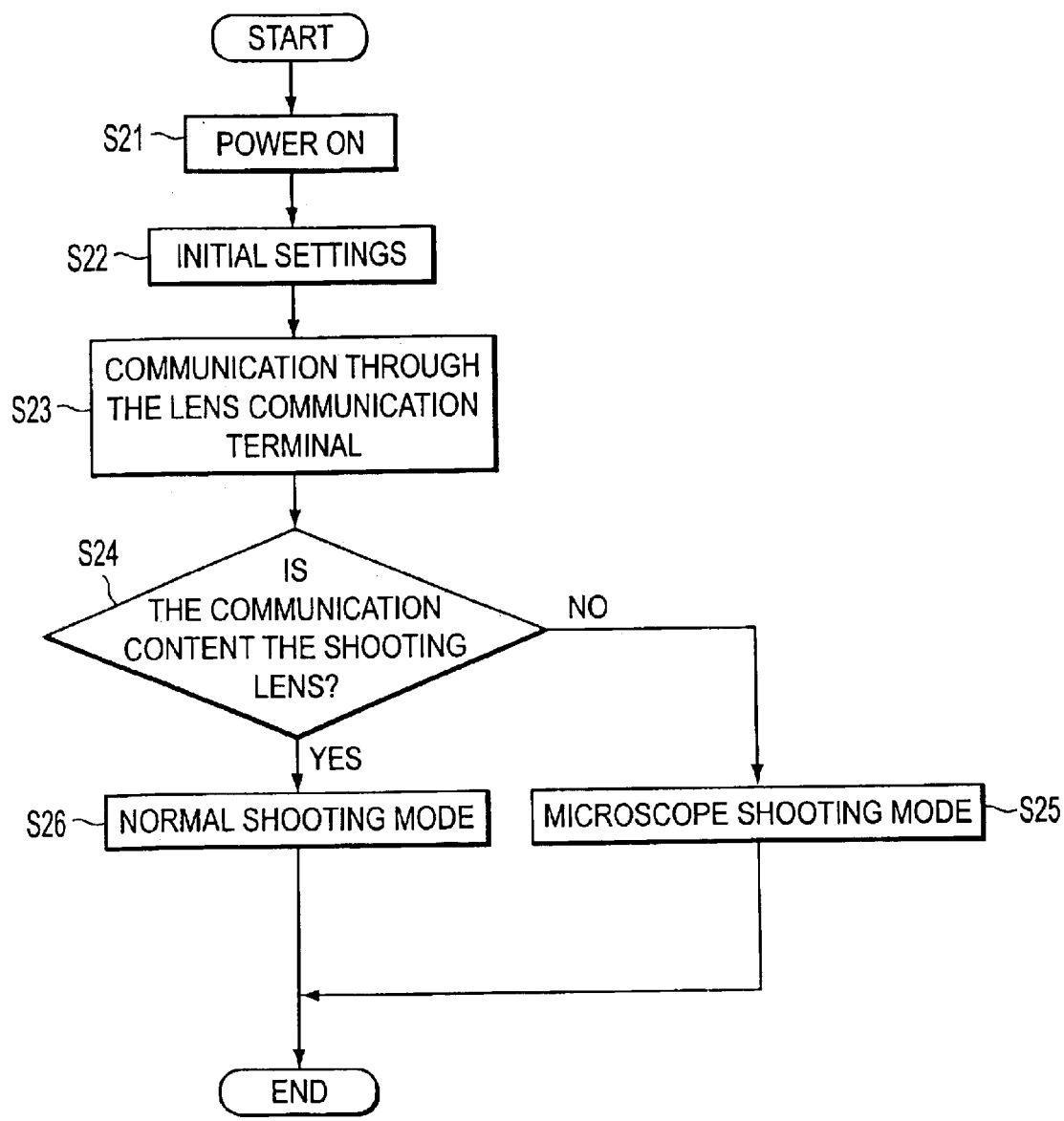
FIG. 10 is another flow chart explaining a procedure used to perform communication of a camera main body 100.

Thus, by setting a switch that can be turned on only when the microscope is mounted onto the mounting part 27, it is determined from the ON or OFF condition of the switch, whether it is a shooting lens or a microscope that is mounted or, alternatively, a mode determination is performed by detecting the operation of the shooting mode changeover switch 24. In either case, by performing communication with the mounted equipment, it is also possible to detect whether it was a shooting lens or a microscope that was mounted. The flow chart of FIG. 10 shows a processing example of this case.

First, the power source of the camera main body 100 is turned on in step S21, and various initial setting processing is performed in step S22. The above processing is the same processing as the processing in steps S1 and S2.

Next, in step S23, the controlling circuit 14 performs communication with the device that is mounted onto the mounting part 27 (a shooting lens or a microscope for this case) through the lens communication terminal 28. Each of these devices has an ID including an identification code showing the type of device (whether it is a shooting lens or a microscope). The controlling circuit 14 receives the ID from each device, and whether the device is a shooting lens is determined in step S24 from the ID that has been provided.

When it is not a shooting lens that is mounted (in the case of a microscope), the program proceeds to S25, and the controlling circuit 14 sets the microscope shooting mode. In step S24, if it is determined that it is a shooting lens that is mounted, the program proceeds to step S26, and the controlling circuit 14 sets the normal shooting mode.

In each mode, the controlling circuit 14 further receives the information of the color temperature from the microscope or the shooting lens, controls the white balance, receives information corresponding to the brightness, calculates the color temperature from this information, and controls the white balance corresponding to the calculation result. These are all the same as the case described earlier.

In the above-described embodiment, the program that performs the processing shown in the flow charts of FIGS. 8, 9, and 10 can be stored in the memory card 13, memory housed in the controlling circuit 14, or the like. Furthermore, this program can be supplied to the user in a condition where it is stored in the memory and/or the memory card 13 in advance, and it can also be supplied to the user in a condition where it is stored in CD-ROM (compact disk-read only memory) or the like where it can be copied to the memory and/or to the memory card 13.

Furthermore, in the above-described embodiment, a structure where an external monitor is connected to a digital camera is used, but it is also possible to apply this invention to a digital camera that has a monitor such as a liquid crystal display.

In addition, in the above-described embodiment, the case is described where this invention is applied to a digital camera, but it is also possible to apply this invention to other imaging devices such as a digital video camera that uses a moving image.

Furthermore, in the above-described embodiment, communication between the microscope or the lens 1 and the camera main body 100 is performed by serial communication, but it is also possible to use other communication methods. Furthermore, it is also possible to communicate by using infrared radiation, radio waves, light, or the like.

Additionally, in the above embodiment, the optical equipment mounted on the camera main body 100 is a shooting lens or a microscope, but other optical equipment can be mounted. Furthermore, it is also possible to control a shooting condition other than the white balance.

The following explains a second embodiment of this invention.

Figure 11:
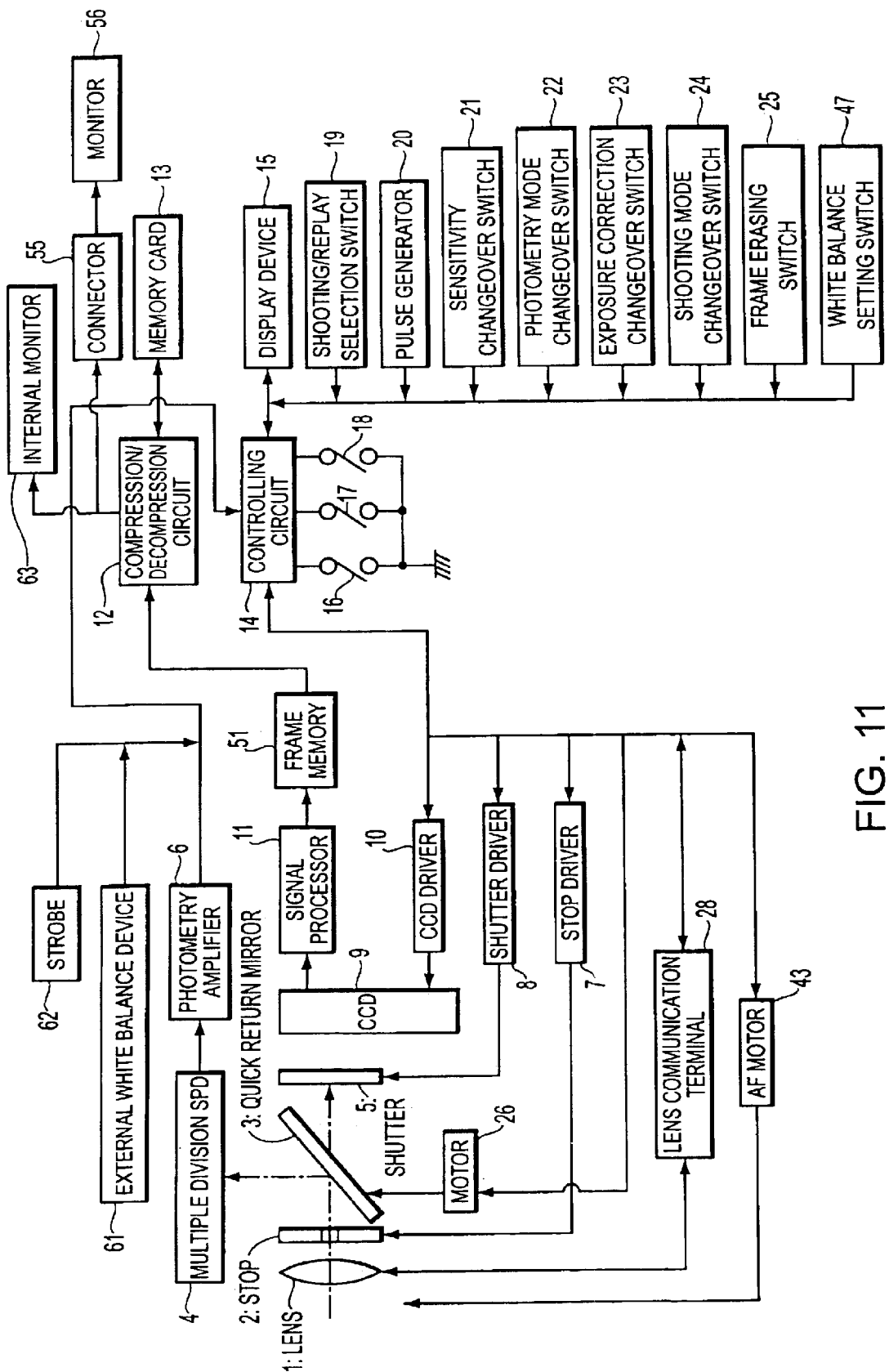
FIG. 11 is a block diagram showing a detailed structural example of a digital camera to which a shooting device of this invention is applied.

FIG. 11 is a block diagram- showing a detailed structural example of a digital camera of the second embodiment. The difference between the block diagram of FIG. 7 of the first embodiment is that it has an external white balance device 61, a strobe 62, and an internal monitor 63.

The external white balance device 61 detects light rays of the object that do not go through the lens 1. The external white balance device 61 can detect the color information from the object regardless of the output from the CCD 9.

The strobe 62 illuminates the object.

The internal monitor 63 is structured by an LCD and is disposed on, for example, a rear face of the camera. The internal monitor 63 is used as an electronic viewfinder and as an image replaying monitor. Other structures are the same as in FIG. 7, so their explanation is omitted.

Figure 12:
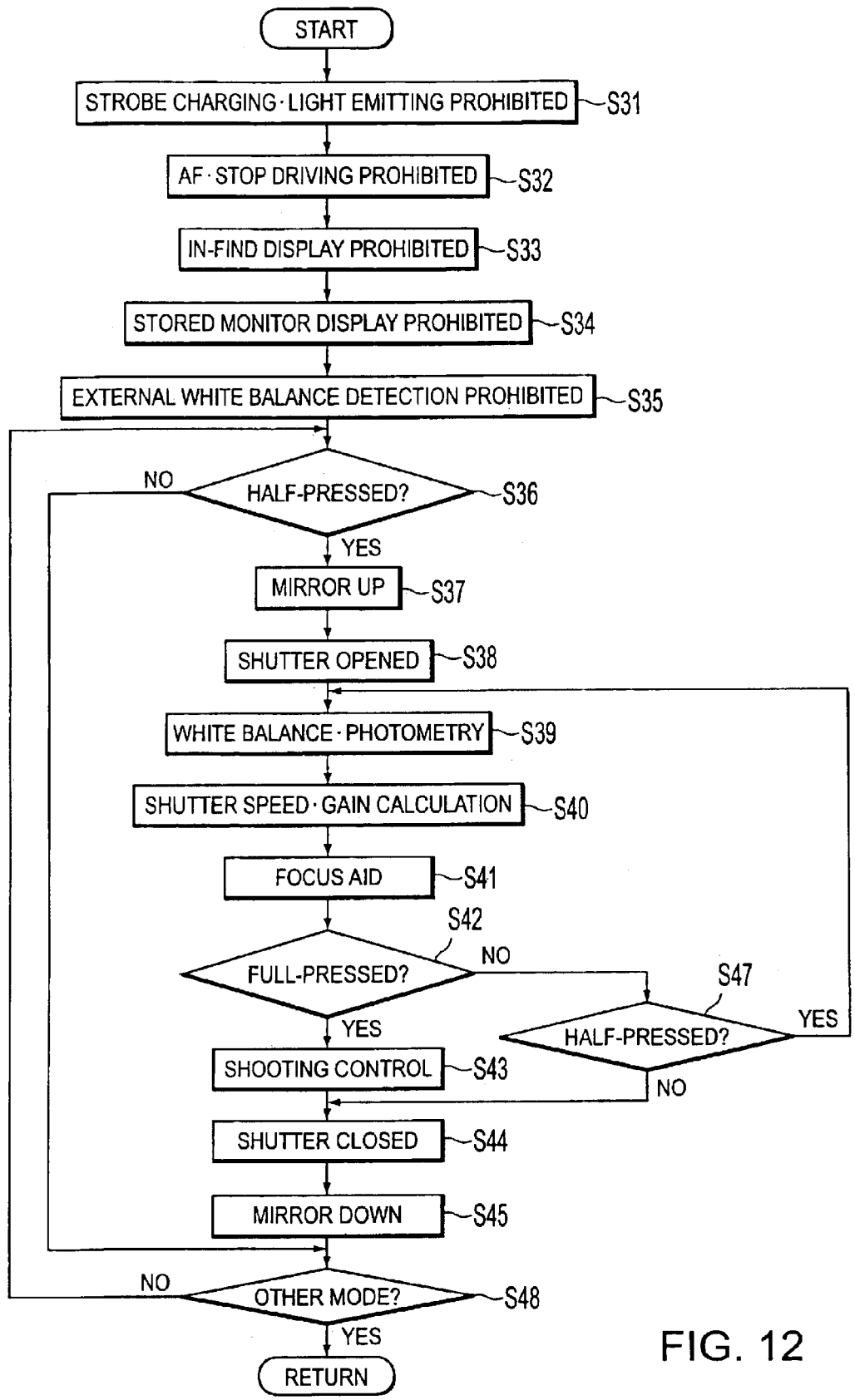
FIG. 12 is a flow chart showing processing performed by a controlling circuit 14 when a digital camera of this embodiment is set at a microscope shooting mode.

FIG. 12 is a flow chart showing processing performed by the controlling circuit 14 when the digital camera in this embodiment is set at the microscope shooting mode. This flow starts having been previously set at the microscope shooting mode.

When it is set at the microscope shooting mode, charging of the strobe 62 is prohibited in step S31. Furthermore, even if the charging of the strobe 62 is completed and is in a light emitting possible condition, or an external strobe is mounted, the light emission of the strobe is prohibited.

In step S32, in the microscope mode, it is determined that there is no lens to be stop-controlled and focus-driven, and controlling of the stop driver 7 and driving of the AF motor 43 are prohibited.

In step S33, when it is mounted onto a microscope, the possibility of looking into the finder is low, so display within the finder is prohibited. Furthermore, in step S34, the possibility of the internal monitor 63 being seen is also low, so the display of the internal monitor 63 is prohibited. Here, it can be considered that the microscope is operated by looking at the external monitor 56, so the output to the monitor 56 is not prohibited.

Next, in step S35, white balance detection by the external white balance device 61 is prohibited. An object that is imaged by the CCD 9 during microscope shooting cannot be measured by the external white balance device 61, so it is not allowed to function.

In step S36, it is determined whether the release button 34 is half-pressed. In step S36, when it is determined that the release button 34 is half-pressed, the program proceeds to step S37, and when it is determined that it is not half-pressed, the program proceeds to step S48.

In step S37, the quick return mirror 3 is moved up, and in step S38, the shutter 5 is opened. By so doing, it is possible to avoid blurring which occurs due to the vibration by the shutter opening and the mirror up during shooting.

In step S39, white balance is detected based upon the output from the CCD 9, and photometry is performed based upon the output from the photometry amp 6. Next, in step S40, the exposure control value, by setting the electronic shutter speed of the CCD 9 and the gain adjustment of the output from the CCD 9, is calculated based upon the photometry data obtained in step S39. Because the stop in the normal lens cannot be used, exposure control unique to the microscope is performed by shutter speed only, or by the gain adjustment of the CCD output and the shutter speed.

In step S41, based upon the output of the CCD 9, it is detected whether it is focused. By displaying the detection result on the external monitor 56, a focus aid function that helps focus is realized.

In step S42, it is determined whether the release button 34 is full-pressed. In step S42, when it is determined that the release button 34 is full-pressed, the program proceeds to step S43, and when it is determined that it is not full-pressed, the program proceeds to step S47.

In step S47, it is determined whether the release button 34 is half-pressed. In step S47, when it is determined that the release button 34 is half-pressed, the program proceeds to step S39, and when it is determined that it is not half-pressed, the program proceeds to step S44.

In step S43, shooting processing is performed, based upon the gain adjustment value and the shutter speed calculated in step S40.

In step S44, the shutter 5 is closed, and in step S45, the quick return mirror 3 is moved down.

In step S48, it is detected whether the microscope shooting mode is changed over to another shooting mode. When it is not changed over to another mode, the program returns to step S36. When it is changed over to another mode, this flow is completed.

When the digital camera is set at the microscope shooting mode, the optimum microscope shooting can be performed by performing the control described above.

Furthermore, in the above embodiment, by setting at the microscope shooting mode, the display of the internal monitor 63 is immediately prohibited. The internal monitor 63 is needed for various settings. Thus, even if it is set at the microscope shooting mode, it is possible to detect a specified time elapse by a timer after the microscope shooting mode is set, and the display can be prohibited, without immediately prohibiting the display. Additionally, even if it is in a condition where the display of the internal monitor 63 is prohibited, it is possible to make the structure such that, when the operation to perform various settings is performed, the LCD can be turned on to enable setting. At that time, only the function used in the microscope such as an interval timer can be set. The setting of the strobe light emitting mode, AF mode, or the like is prohibited.

What is claimed is:

1. A digital camera having a mounting part to mount a shooting lens or other optical equipment, comprising:

image capturing means for capturing image data corresponding to an object image;

converting means for converting the image data into digital format;

changing means for changing between a mode in which shooting is performed using the shooting lens and a mode in which shooting is performed using the other optical equipment;

information receiving means for communicating with the shooting lens or with the other optical equipment mounted on the mounting part and for receiving information from the shooting lens or from the other optical equipment; and control means for controlling the camera so as to change a type of information that is received through the information receiving means from the shooting lens or from the other optical equipment based upon the mode that has been changed by the changing means, wherein when changed to the mode that shoots using the other optical equipment by the changing means:

the information receiving means receives information corresponding to a color temperature of a light source of the other optical equipment from the other optical equipment; and the control means controls a shooting state of the camera based upon the information received by the information receiving means.

2. A digital camera having a mounting part to mount a shooting lens or other optical equipment, comprising:

image capturing means for capturing image data corresponding to an object image;

converting means for converting the image data into digital format;

changing means for changing between a mode in which shooting is performed using the shooting lens and a mode in which shooting is performed using the other optical equipment;

information receiving means for communicating with the shooting lens or with the other optical equipment mounted on the mounting part and for receiving information from the shooting lens or from the other optical equipment; and control means for controlling the camera so as to change a type of information that is received through the information receiving means from the shooting lens or from the other optical equipment based upon the mode that has been changed by the changing means, wherein when changed to the mode in which shooting is performed using the other optical equipment by the changing means:

the information receiving means receives information corresponding to brightness of a light source of the other optical equipment from the other optical equipment;

and further comprising calculation means for calculating a color temperature of the light source from the information corresponding to the brightness of the light source; and the control means controls a shooting state of the camera based upon the color temperature calculated by the calculation means.

3. The digital camera as set forth in claim 1, wherein the other optical equipment is a microscope, and the mounting part is connectable to the microscope.

4. The digital camera as set forth in claim 1, wherein:

when the mode is changed to the mode in which shooting is performed by the shooting lens, color temperature data is obtained by a white balance detector of the camera, without receiving the color temperature data from the shooting lens through the information receiving means, and the control means controls the converting means to convert the image data using the color temperature data obtained by the white balance detector; and when the mode is changed to the mode in which shooting is performed by the other optical equipment, color temperature data is transmitted to the camera from the other optical equipment through the information receiving means, and the control means controls the converting means to convert the image data using the color temperature data transmitted from the other optical equipment.

5. A digital camera having a mounting part to mount a shooting lens or other optical equipment, comprising:

image capturing means for capturing image data corresponding to an object image;

converting means for converting the image data into digital format;

communication means for communicating with the shooting lens or with the other optical equipment mounted onto the mounting part;

determination means for determining whether the shooting lens or the other optical equipment is mounted onto the mounting part based upon the communication by the communication means;

setting means for setting a mode in which shooting is performed by the camera using the shooting lens or a mode in which shooting is performed by the camera using the other optical equipment, corresponding to the determination result of the determination means;

wherein the setting means controls the camera so as to change a type of information that is received through the communication means from the shooting lens or from the other optical equipment based upon the mode that has been set by the setting means, and wherein when the mode in which shooting is performed using the other optical equipment is set, the communication means receives information corresponding to a color temperature of a light source of the other optical equipment from the other optical equipment;

and further comprising control means for controlling a shooting state of the camera based upon the information received by the communication means.

6. A digital camera having a mounting part to mount a shooting lens or other optical equipment, comprising:
   image capturing means for capturing image data corresponding to an object image;
   converting means for converting the image data into digital format;
   communication means for communicating with the shooting lens or with the other optical equipment mounted onto the mounting part;
   determination means for determining whether the shooting lens or the other optical equipment is mounted onto the mounting part based upon the communication by the communication means;
   setting means for setting a mode in which shooting is performed by the camera using the shooting lens or a mode in which shooting is performed by the camera using the other optical, equipment corresponding to the determination result of the determination means;
   wherein the setting means controls the camera so as to change a type of information that is received through the communication means from the shooting lens or from the other optical equipment based upon the mode that has been set by the setting means, and
   wherein when the mode in which shooting is performed using the other optical equipment is set, the communication means receives information corresponding to a brightness of a light source of the other optical equipment from the other optical equipment; and further comprising:
      calculation means for calculating a color temperature of the light source from the information corresponding to the brightness of the light source; and
      control means for controlling a shooting state of the camera based upon the color temperature calculated by the calculation means.

7. The digital camera as set forth in claim 5, wherein when the mode is set to the mode in which shooting is performed by the shooting lens, color temperature data is obtained by a white balance detector of the camera, without receiving the color temperature data from the shooting lens through the communication means, and the control means controls the converting means to convert the image data using the color temperature data obtained by the white balance detector.

8. A digital camera having a mounting part to mount a shooting lens or other optical equipment, comprising:
   a photoelectric converter that converts an object image into image data corresponding to the object image;
   a converter that converts the image data into digital format;
   a mode switch that changes between a mode in which shooting is performed using the shooting lens and a mode in which shooting is performed using the other optical equipment;
   an information interface that communicates with the shooting lens or with the other optical equipment mounted on the mounting part and that receives information from the shooting lens or from the other optical equipment corresponding to the mode that has been changed by the mode switch; and
   a controller that controls the camera so as to change a type of information that is received through the information interface from the shooting lens or from the other optical equipment based upon the mode that has been changed by the mode switch,
   wherein when changed to the mode that shoots using the other optical equipment by the mode switch:
      the information interface receives information corresponding to a color temperature of a light source of the other optical equipment from the other optical equipment; and
      the controller controls a shooting state of the camera based upon the information received by the information interface.

9. A digital camera having a mounting part to mount a shooting lens or other optical equipment, comprising:
   a photoelectric converter that converts an object image into image data corresponding to the object image;
   a converter that converts the image data into digital format;
   a mode switch that changes between a mode in which shooting is performed using the shooting lens and a mode in which shooting is performed using the other optical equipment;
   an information interface that communicates with the shooting lens or with the other optical equipment mounted on the mounting part and that receives information from the shooting lens or from the other optical equipment corresponding to the mode that has been changed by the mode switch; and
   a controller that controls the camera so as to change a type of information that is received through the information interface from the shooting lens or from the other optical equipment based upon the mode that has been changed by the mode switch,
   wherein when changed to the mode in which shooting is performed using the other optical equipment by the mode switch:
      the information interface receives information corresponding to brightness of a light source of the other optical equipment from the other optical equipment; and
      the controller calculates a color temperature of the light source from the information corresponding to the brightness of the light source, and controls a shooting state of the camera based upon the color temperature calculated by the controller.

10. The digital camera as set forth in claim 8, wherein the other optical equipment is a microscope, and the mounting part is connectable to the microscope.

11. The digital camera as set forth in claim 8, wherein:
   when the mode is changed to the mode in which shooting is performed by the shooting lens, color temperature data is obtained by a white balance detector of the camera, without receiving the color temperature data from the shooting lens through the information interface, and the controller controls the converter to convert the image data using the color temperature data obtained by the white balance detector; and
   when the mode is changed to the mode in which shooting is performed by the other optical equipment, color temperature data is transmitted to the camera from the other optical equipment through the information interface, and the controller controls the converter to convert the image data using the color temperature data transmitted from the other optical equipment.

12. A digital camera having a mounting part to mount a shooting lens or other optical equipment, comprising:
   a photoelectric converter that converts an object image into image data corresponding to the object image;
   a converter that converts the image data into digital format;

an information interface that communicates with the shooting lens or with the other optical equipment mounted onto the mounting part; and a controller that (i) determines whether the shooting lens or the other optical equipment is mounted onto the mounting part based upon the communication through the information interface, (ii) sets a mode in which shooting is performed by the camera using the shooting lens or a mode in which shooting is performed by the camera using the other optical equipment, corresponding to the determination result, and (iii) controls the camera so as to change a type of information that is received through the information interface from the shooting lens or from the other optical equipment based upon the mode that has been set, wherein when the mode in which shooting is performed using the other optical equipment is set, the information interface receives information corresponding to a color temperature of a light source of the other optical equipment from the other optical equipment; and the controller controls a shooting state of the camera based upon the information received by the information interface.

13. A digital camera having a mounting part to mount a shooting lens or other optical equipment, comprising:

a photoelectric converter that converts an object image into image data corresponding to the object image;

a converter that converts the image data into digital format;

an information interface that communicates with the shooting lens or with the other optical equipment mounted onto the mounting part; and a controller that (i) determines whether the shooting lens or the other optical equipment is mounted onto the mounting part based upon the communication through the information interface, (ii) sets a mode in which shooting is performed by the camera using the shooting lens or a mode in which shooting is performed by the camera using the other optical equipment, corresponding to the determination result, and (iii) controls the camera so as to change a type of information that is received through the information interface from the shooting lens or from the other optical equipment based upon the mode that has been set, wherein when the mode in which shooting is performed using the other optical equipment is set, the information interface receives information corresponding to a brightness of a light source of the other optical equipment from the other optical equipment; and the controller calculates a color temperature of the light source from the information corresponding to the brightness of the light source, and controls a shooting state of the camera based upon the calculated color temperature.

14. The digital camera set forth in claim 12, wherein when the mode is set to the mode in which shooting is performed by the shooting lens, color temperature data is obtained by measurements made by a white balance detector of the camera, and the controller controls the converter to convert the image data using the color temperature data obtained by the white balance detector.

* * * * *